US012327953B2

(12) United States Patent
Ito et al.

(10) Patent No.: US 12,327,953 B2
(45) Date of Patent: Jun. 10, 2025

(54) TWO PART SHIELD TERMINAL WITH POSITION STABILIZATION AND CONNECTOR THEREWITH

(71) Applicant: SUMITOMO WIRING SYSTEMS, LTD., Mie (JP)

(72) Inventors: Yusuke Ito, Mie (JP); Tomoaki Yasuda, Mie (JP); Shohei Mitsui, Mie (JP); Wataru Yamanaka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 406 days.

(21) Appl. No.: 17/989,360

(22) Filed: Nov. 17, 2022

(65) Prior Publication Data

US 2023/0163532 A1 May 25, 2023

(30) Foreign Application Priority Data

Nov. 24, 2021 (JP) ................................ 2021-190344

(51) Int. Cl.
*H01R 13/6582* (2011.01)
*H01R 9/05* (2006.01)
(Continued)

(52) U.S. Cl.
CPC ....... *H01R 13/6582* (2013.01); *H01R 9/0518* (2013.01); *H01R 13/42* (2013.01); *H01R 13/432* (2013.01); *H01R 13/6271* (2013.01); *H01R 13/629* (2013.01); *H01R 13/658* (2013.01); *H01R 24/40* (2013.01); *H01R 24/545* (2013.01); *H01R 9/05* (2013.01); *H01R 13/40* (2013.01);
(Continued)

(58) Field of Classification Search
CPC .. H01R 13/6582; H01R 9/0518; H01R 13/42; H01R 13/432; H01R 13/6271; H01R 13/629; H01R 13/658; H01R 24/40; H01R 24/545; H01R 9/05; H01R 13/40; H01R 13/422; H01R 13/4223; H01R 13/4226; H01R 13/502; H01R 13/6581; H01R 13/6583; H01R 13/6592; H01R 13/6593; H01R 24/38; H01R 24/54
See application file for complete search history.

(56) References Cited

U.S. PATENT DOCUMENTS

2007/0238358 A1* 10/2007 Akino .................. H01R 9/0518
439/607.17

FOREIGN PATENT DOCUMENTS

JP H05-059773 U 8/1993
JP 2013-222684 A 10/2013

* cited by examiner

*Primary Examiner* — Justin M Kratt
(74) *Attorney, Agent, or Firm* — Venjuris, P.C.

(57) ABSTRACT

A shield terminal includes a first outer conductor and a second outer conductor. The first outer conductor includes a barrel portion that is electrically connected to a shield portion of an electric wire, and an engaging portion capable of engaging with a housing, and the second outer conductor includes a main body portion and an extension portion extending rearward from the main body portion. A rear end portion of the extension portion is sandwiched between the barrel portion and the electric wire. A fastener portion is formed on a front side of the second outer conductor relative to the rear end of the extension portion, and a fastening portion capable of coming into contact with the fastener portion in a direction of rotation about the engaging portion is formed forward of the engaging portion of the first outer conductor.

4 Claims, 5 Drawing Sheets

(51) Int. Cl.

| | |
|---|---|
| ***H01R 13/42*** | (2006.01) |
| ***H01R 13/432*** | (2006.01) |
| ***H01R 13/627*** | (2006.01) |
| ***H01R 13/629*** | (2006.01) |
| ***H01R 13/658*** | (2011.01) |
| ***H01R 24/40*** | (2011.01) |
| ***H01R 24/54*** | (2011.01) |
| *H01R 13/40* | (2006.01) |
| *H01R 13/422* | (2006.01) |
| *H01R 13/502* | (2006.01) |
| *H01R 13/6581* | (2011.01) |
| *H01R 13/6583* | (2011.01) |
| *H01R 13/6592* | (2011.01) |
| *H01R 13/6593* | (2011.01) |
| *H01R 24/38* | (2011.01) |

(52) U.S. Cl.

CPC ........ *H01R 13/422* (2013.01); *H01R 13/4223* (2013.01); *H01R 13/4226* (2013.01); *H01R 13/502* (2013.01); *H01R 13/6581* (2013.01); *H01R 13/6583* (2013.01); *H01R 13/6592* (2013.01); *H01R 13/6593* (2013.01); *H01R 24/38* (2013.01); *H01R 24/54* (2013.01)

TWO PART SHIELD TERMINAL WITH POSITION STABILIZATION AND CONNECTOR THEREWITH

CROSS-REFERENCE TO RELATED APPLICATIONS

This application is based on and claims priority from Japanese Patent Application No. 2021-190344, filed on Nov. 24, 2021, with the Japan Patent Office, the disclosure of which is incorporated herein in its entirety by reference.

TECHNICAL FIELD

The present invention relates to a shield terminal and a connector.

BACKGROUND

JP 2013-222684A and JP H5-059773U disclose a shield terminal that includes an outer conductor. The outer conductor includes a main body portion, and a barrel portion that is connected to a shield portion of an electric wire, on the rear side relative to the main body portion.

Note that the outer conductor is referred to as an "outer conductor" in JP 2013-222684A, and a "connecter outer shell portion" in JP H5-059773U. The shield terminal is referred to as an "L-shaped coaxial connector" in JP 2013-222684A, and a "female connector" in JP H5-059773U. The main body portion is referred to as a "tubular portion" in JP 2013-222684A, and a "tubular coupling portion" in JP H5-059773U. The barrel portion is referred to as a "shield wire crimping portion" in JP 2013-222684A, and a "crimp portion" in JP H5-059773U.

SUMMARY

The outer conductor is usually a single member obtained by integrating a barrel portion and a main body portion. In contrast, in order to increase, for example, the degree of freedom of the structures of the barrel portion and the main body portion, it is possible to separately configure a first outer conductor on the barrel portion side and a second outer conductor on the main body portion side.

However, when the outer conductor is separated into the first outer conductor and the second outer conductor, and an electric wire connected to the barrel portion of the first outer conductor is pulled rearward in a state where the shield terminal is engaged in a housing, there is a concern that the first outer conductor will be displaced relative to the second outer conductor.

In view of this, an object of the present disclosure is to provide a shield terminal and a connector that can prevent displacement of a first outer conductor and a second outer conductor from each other.

A shield terminal according to the present disclosure includes: a first outer conductor and a second outer conductor that are to be attached to each other, the first outer conductor includes a barrel portion that is connected to a shield portion of an electric wire, and an engaging portion capable of engaging with a housing, the second outer conductor includes a main body portion and an extension portion that extends rearward from the main body portion, a rear end portion of the extension portion is held sandwiched between the barrel portion and the electric wire, a fastener portion is formed on a front side of the second outer conductor relative to the rear end portion of the extension portion, and a fastening portion capable of coming into contact with the fastener portion in a direction of rotation about the engaging portion is formed forward of the engaging portion of the first outer conductor.

According to the present disclosure, it is possible to provide a shield terminal that can prevent displacement of a first outer conductor and a second outer conductor.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
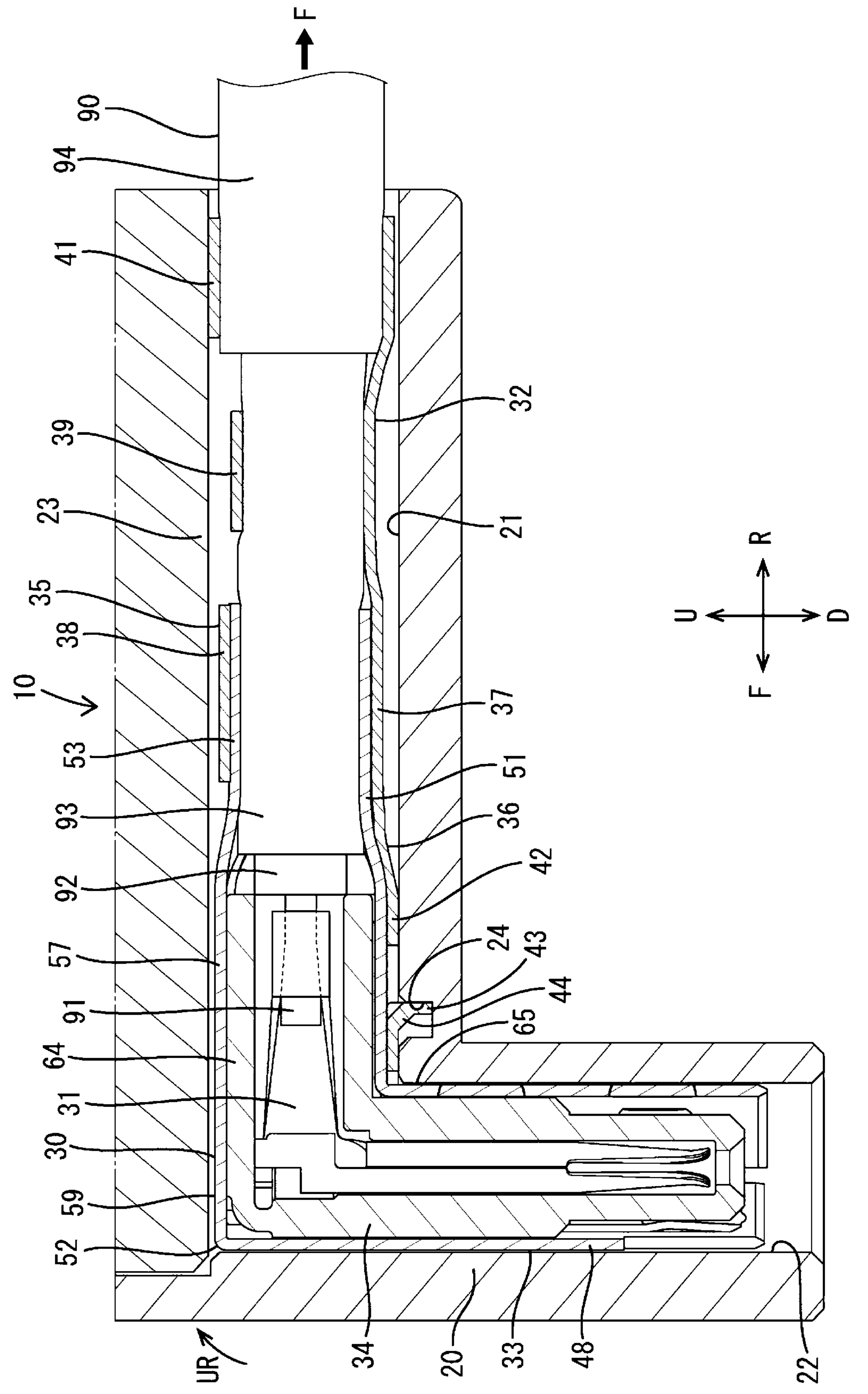
FIG. 1 is a cross-sectional view showing a state where a shield terminal is accommodated in a housing, in a first embodiment of the present disclosure.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

First, embodiments of the present disclosure will be listed and described.

(1) A shield terminal according to the present disclosure includes: a first outer conductor and a second outer conductor that are to be attached to each other, the first outer conductor includes a barrel portion that is connected to a shield portion of an electric wire, and an engaging portion capable of engaging with a housing, the second outer conductor includes a main body portion and an extension portion that extends rearward from the main body portion, a rear end portion of the extension portion is held sandwiched between the barrel portion and the electric wire, a fastener portion is formed on a front side of the second outer conductor relative to the rear end portion of the extension portion, and a fastening portion capable of coming into contact with the fastener portion in a direction of rotation about the engaging portion is formed forward of the engaging portion of the first outer conductor.

When the electric wire is pulled rearward in a state where the shield terminal is accommodated in the housing and the engaging portion is engaged with the housing, there is a concern that the first outer conductor will be displaced relative to the second outer conductor in a direction of rotation (inclination) about the engaging portion engaged with the housing. However, with the above configuration, the fastening portion of the first outer conductor can come into contact with the fastener portion of the second outer conductor in a direction of rotation about the engaging portion, and thus it is possible to prevent displacement of the second outer conductor relative to the first outer conductor.

(2) Preferably, the main body portion intersects the extension portion and extends in an up-down direction, and has a shape that enables insertion into the housing, and the engaging portion opposes the main body portion, rearward of the main body portion, in a state where the first outer conductor and the second outer conductor are attached to each other.

In addition, preferably, in a connector that includes the above shield terminal and the housing, the housing includes an engagement portion to be engaged with the engaging portion, and an insertion portion into which the main body portion is inserted, forward of the engagement portion, and the insertion portion and the engagement portion are aligned with each other in a front-rear direction.

According to the above configuration, when the electric wire is pulled rearward in a state where the shield terminal is accommodated in the housing, a force resulting from the pulling can be taken on by a portion of engagement between the engagement portion and the engaging portion. Accordingly, recession of the main body portion is restrained, and it is possible to avoid a situation where the main body portion interferes with the inner surface (rear surface) of the insertion portion of the housing and is deformed.

(3) Preferably, the first outer conductor includes a base portion that extends forward from the barrel portion, and a pair of rising portions that rise from right and left end portions of the base portion, the engaging portion has a shape obtained by folding a portion of the base portion, the fastening portion is formed at a leading end portion in a rising direction of each of the rising portions, and the rising portions are formed in a plate shape that overlaps an outer surface of the second outer conductor so as to close a gap in the second outer conductor.

According to the above configuration, it is also possible to increase the degree of freedom with which the engaging portion can be formed. In addition, the fastening portion can be easily formed without performing a special process on the leading end portion in the rising direction of the rising portion. Furthermore, as a result of the rising portion closing a gap in the second outer conductor, it is possible to prevent leakage and intrusion of noise.

Detailed Embodiments of Present Disclosure

Specific examples of the present disclosure will be described below with reference to the drawings. Note that the present invention is not limited to illustrations of these, but is indicated by the claims, and all changes that come within the meaning and range of equivalency of the claims are intended to be embraced therein.

First Embodiment

As shown in FIG. 1, a connector 10 according to a first embodiment of the present disclosure includes a housing 20 and a shield terminal 30. The shield terminal 30 is accommodated in the housing 20 in a state of being attached to a terminal portion of an electric wire 90. Note that, in the following description, the front-rear direction corresponds to the longitudinal direction of the electric wire 90, and the side on which the electric wire 90 is routed when viewed from the shield terminal 30 is defined as a rear side. In the up-down direction, the side on which the shield terminal 30 is attached to the housing 20 is defined as the upper side. This up-down direction is not in reference to a positional relation or a direction when the connector 10 is actually mounted in a device such as an automobile. "F", "R", "U", and "D" in the drawings respectively indicate "front side", "rear side", "upper side", and "lower side.

Housing

The housing 20 is made of a synthetic resin, and includes an accommodation groove 21 extending in the front-rear direction, and an insertion portion 22 extending downward from the front end portion of the accommodation groove 21, as shown in FIG. 1. The accommodation groove 21 is open upward along the entire length thereof in the front-rear direction. A covering member 23 such as a cover or another housing is mounted to the housing 20 from above in order to close the upper surface of the accommodation groove 21.

A recessed engagement portion 24 is formed in the lower surface of the accommodation groove 21 of the housing 20. The engagement portion 24 is disposed at a position close to the front end portion of the accommodation groove 21, near the rear side of the insertion portion 22.

Electric Wire

As shown in FIG. 1, the electric wire 90 is a shield wire (coaxial electric wire), and includes a core wire 91, an insulation coating 92, a shield portion 93, and a sheath 94 in order from the central axis to the outer circumference thereof. At the front end portion of the electric wire 90, the sheath 94 and the insulation coating 92 are removed, and the core wire 91 and the shield portion 93 are sequentially exposed. The shield portion 93 is a braided wire or the like, and is connected to an earth portion (not illustrated).

Shield Terminal

As shown in FIG. 1, the shield terminal 30 includes an inner conductor 31, outer conductors 32 and 33 that surround the outer periphery of the inner conductor 31, and a dielectric body 34 that is disposed between the inner conductor 31 and the outer conductors 32 and 33. The inner conductor 31, the outer conductors 32 and 33, and the dielectric body 34 are all L-shaped in a side view, and correspond to the entire shape of the shield terminal 30. The outer conductors 32 and 33 and the inner conductor 31 are made of a conductive metal, and the dielectric body 34 is made of a synthetic resin. The dielectric body 34 electrically insulates the inner conductor 31 and the outer conductors 32 and 33 from each other. A rear end portion of the portion of the inner conductor 31 that extends in the front-rear direction is crimped and electrically connected to the core wire 91 of the electric wire 90, and a lower end portion of the portion of the inner conductor 31 that extends in the up-down direction is electrically connected to a partner inner conductor of a partner terminal (not illustrated).

Figure 2:
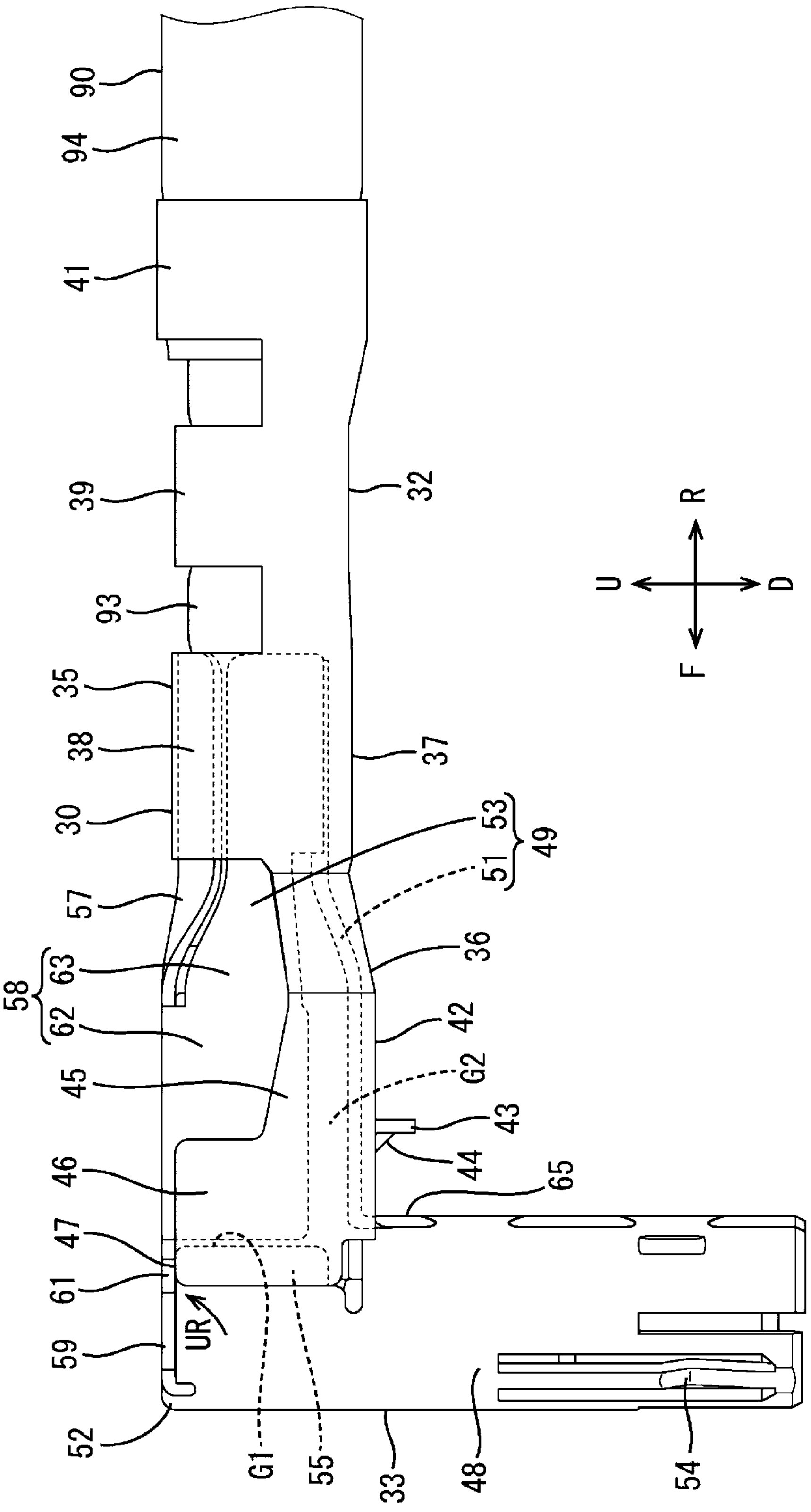
FIG. 2 is a side view of the shield terminal.

As shown in FIG. 2, the outer conductors 32 and 33 form an outer shell of the shield terminal 30, and are composed of a first outer conductor 32 and a second outer conductor 33 that are attached and connected to each other.

Figure 3:
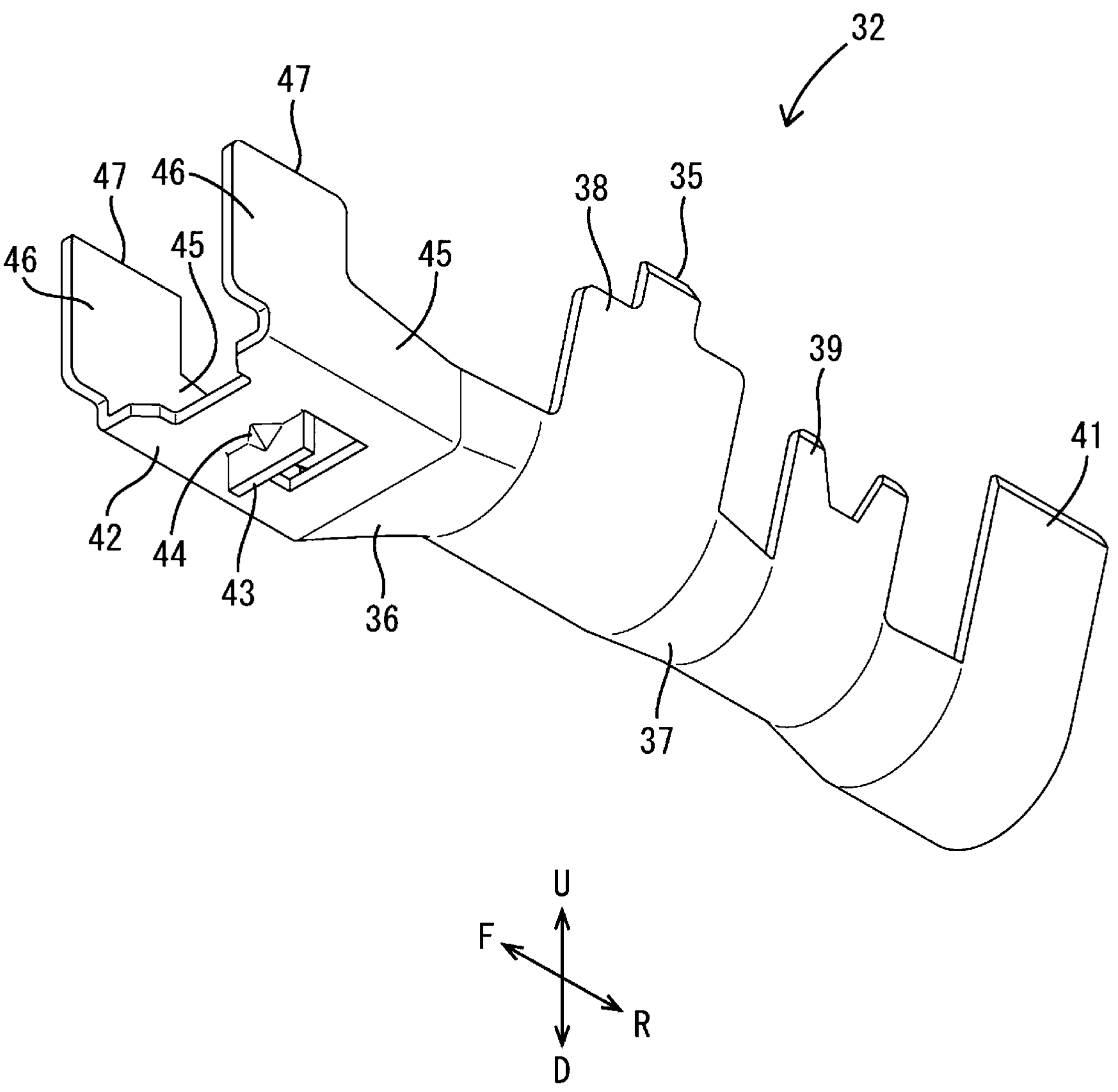
FIG. 3 is a perspective view of a first outer conductor.

The first outer conductor 32 is formed by performing a bending process or the like on a metal plate. The first outer conductor 32 includes a barrel portion 35 and a base portion 36 that extends forward from the barrel portion 35. As shown in FIGS. 2 and 3, the barrel portion 35 includes a bottom portion 37 that extends in the front-rear direction. The bottom portion 37 and the base portion 36 are provided continuous to each other in the front-rear direction. The barrel portion 35 includes a right-and-left pair of front barrel pieces 38 (only one front barrel piece 38 is illustrated in FIGS. 2 and 3) that rise from a front end portion of the bottom portion 37, a right-and-left pair of intermediate barrel pieces 39 (only one intermediate barrel piece 39 is illustrated in FIGS. 2 and 3) that rise from a front-rear intermediate portion of the bottom portion 37, and a right-and-left pair of rear barrel pieces 41 (only one rear barrel piece is illustrated in FIGS. 2 and 3) that rise from a rear end portion of the bottom portion 37.

The barrel portion 35 is crimped and connected to the electric wire 90, and is bent into a shape having a circular cross-section or a cross-section close to a circular cross-section as a whole while curving the bottom portion 37. The diameters of a portion of the barrel portion 35 corresponding to the intermediate barrel pieces 39 is smaller than the diameters of portions corresponding to the front barrel pieces 38 and the rear barrel pieces 41.

The base portion 36 includes a plate-like portion 42 that is flat in the front-rear direction and the right-left direction, at a position lower than the bottom portion 37. In a central portion of the plate-like portion 42, an engaging portion 43 is formed by folding the plate-like portion 42. Specifically, a notch having a square U-shape is formed in a central portion of the plate-like portion 42, a plate piece portion of the notch is folded downward from the front end thereof, whereby the engaging portion 43 is formed. The engaging portion 43 is formed in a rectangular shape, and is disposed along the up-down direction with the plate surfaces thereof being directed forward and rearward. A reinforcement portion 44 having a triangular pyramid shape is provided at a root portion of the engaging portion 43. The reinforcement portion 44 is shaped by pushing a portion that extends from a root portion of the engaging portion 43 to a front end side of the plate-like portion 42 so as to expand forward.

The first outer conductor 32 includes a pair of rising portions 45 that rise from right and left end portions of the base portion 36. The rising portions 45 are each formed in a plate shape extending along the up-down direction. Rear ends of the rising portions 45 are respectively coupled to the front barrel pieces 38.

On the front end side of each of the rising portions 45, a rising main body portion 46 that is rectangular in a side view is formed to be raised to be higher than the rising portions 45. An upper end of the rising main body portion 46 serves as a fastening portion 47 that can come into contact with a fastener portion 61 of the second outer conductor 33, which will be described later. The fastening portion 47 of the rising main body portion 46 is disposed along the front-rear direction.

Figure 4:
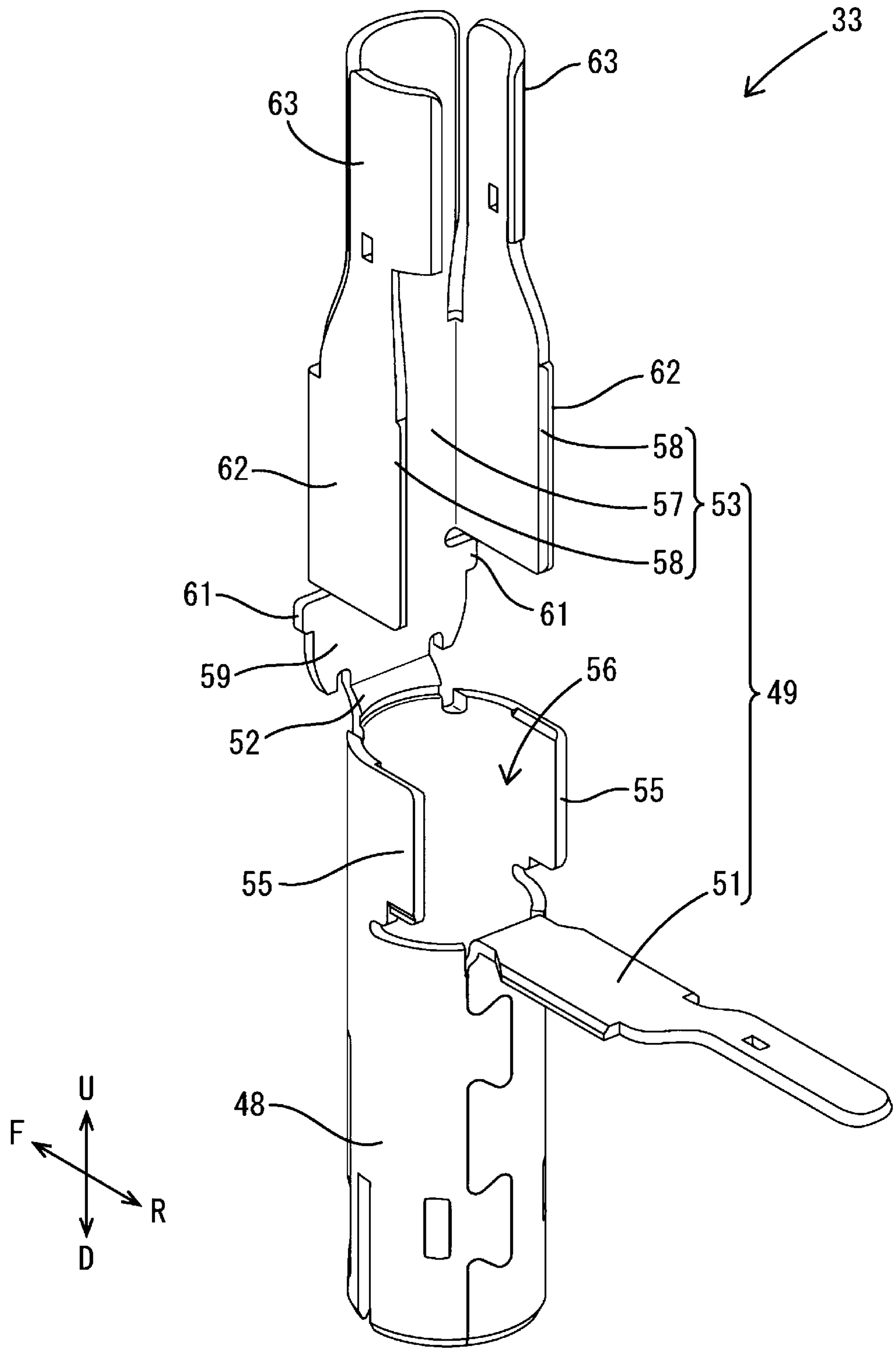
FIG. 4 is a perspective view of a second outer conductor in an open state.

The second outer conductor 33 is formed by performing a bending process or the like on a metal plate. As shown in FIGS. 2 and 4, the second outer conductor 33 includes a cylindrical main body portion 48 and an extension portion 49 shaped as a plate piece. The extension portion 49 includes a lower extension portion 51 that is continuous to the main body portion 48 at a right angle, and an upper extension portion 53 that is continuous to the main body portion 48 via hinges 52 in an openable and closable manner to an open state (state shown in FIG. 4) and a closed state (state shown in FIGS. 1, 2, and 5). In the open state, the extension portion 49 rises from the main body portion 48, and an upper surface opening of the main body portion 48 is open. In the closed state, the extension portion 49 is disposed in the front-rear direction, and the upper surface opening of the main body portion 48 is closed by an extension base end portion 59, which will be described later.

The main body portion 48 is electrically connected to a partner outer conductor of a partner terminal (not illustrated) while being inserted into the insertion portion 22 of the housing 20. An elastic contact portion 54 (see FIG. 2) that can come into contact with the partner outer conductor and that is disposed in the main body portion 48 is formed on the lower end side of the main body portion 48. The main body portion 48 includes an opposing surface 65 that is directed rearward so as to oppose the engaging portion 43.

As shown in FIG. 4, on the upper end side of the main body portion 48, a right-and-left pair of engaging pieces 55 that are shaped as a plate piece are formed, and an open portion 56 that is open rearward is formed between rear ends of the engaging pieces 55. The lower extension portion 51 shaped as a plate piece that extends rearward from a lower end of the open portion 56 of the main body portion 48. A rear end portion of the lower extension portion 51 is formed to have a width that is smaller than that of the front end portion of the lower extension portion 51. The upper extension portion 53 includes a plate-piece shaped main extension portion 57 that is continuous to an upper end front portion of the main body portion 48 via the hinges 52, and a pair of sub extension portions 58 that are bent from right and left end portions of the main extension portion 57 at a right angle.

Figure 5:
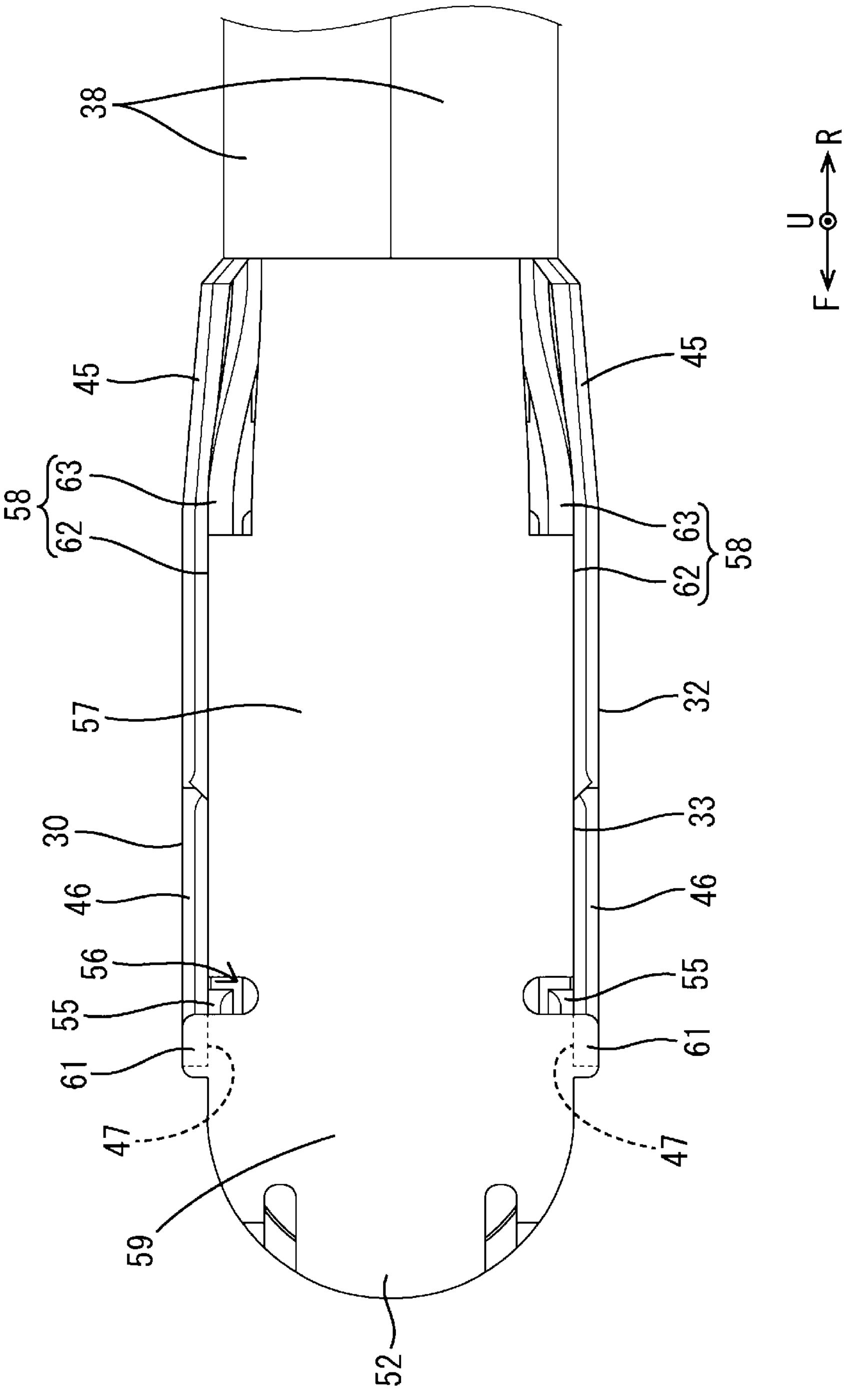
FIG. 5 is a plan view of a front end side of the shield terminal.

As shown in FIG. 2, the main extension portion 57 extends in the front-rear direction in the closed state. The extension base end portion 59 that closes the upper surface opening of the main body portion 48 in the closed state is formed at a position of the main extension portion 57 close to the hinges 52. In the closed state, the extension base end portion 59 is positioned on the front side of the sub extension portions 58, and is disposed along the front-rear direction and the right-left direction. As shown in FIGS. 4 and 5, a right-and-left pair of fastener portions 61 that protrude laterally are formed on the extension base end portion 59. The fastener portions 61 have a rectangular shape, and protrude above the open portion 56 and on the lateral sides relative to the outer periphery of the main body portion 48, in the closed state. The lateral protruding length of the fastener portions 61 is the same as the thickness of the rising main body portions 46, which is the same as the width of the fastening portions 47, or larger than the thickness of the rising main body portions 46.

The sub extension portions 58 include a pair of coupling end portions 62 that protrude downward from right and left end portions of the main extension portion 57 in the closed state, and a pair of divided portions 63 that extend rearward from the coupling end portions 62. In the closed state, a rear end portion of the main extension portion 57, a rear end portion of the lower extension portion 51, and the divided portions 63 from a circular shape or a shape close to a circular shape as a whole in a rear view, and are disposed along the outer periphery of the shield portion 93 of the electric wire 90. As shown in FIG. 2, in a state where the first outer conductor 32 and the second outer conductor 33 are attached to each other, the rear end portion of the lower extension portion 51 is covered by the bottom portion 37 of the first outer conductor 32, and rear end portions of the main extension portion 57 and the divided portions 63 are covered by the front barrel pieces 38 of the first outer conductor 32. As a result of the main extension portion 57, the lower extension portion 51, and the divided portions 63 being covered by and held by the barrel portion 35 in this manner, the attached state of the first outer conductor 32 and the second outer conductor 33 is maintained.

Method and Structure for Attaching Shield Terminal

The second outer conductor 33 is brought into the open state (state shown in FIG. 4), and the dielectric body 34 is inserted into the main body portion 48 from above. The inner conductor 31 connected to the core wire 91 of the electric wire 90 is accommodated in the dielectric body 34 in advance. Understandably, a configuration may also be adopted in which, if the dielectric body 34 has a lid portion 64 (see FIG. 1), the dielectric body 34 is inserted into the main body portion 48, and then the inner conductor 31 is inserted into the dielectric body 34, and the lid portion 64 is closed.

Next, the second outer conductor 33 is brought into the closed state. In the closed state, as shown in FIG. 1, the main extension portion 57 of the second outer conductor 33 is disposed so as to be capable of coming into contact with the upper surface of the dielectric body 34. In addition, in the closed state, as shown in FIG. 2, a gap G1 extending along the up-down direction is formed between a rear end of each engaging piece 55 and a front end of the coupling end portion 62, and a gap G2 extending along the front-rear direction is formed between each sub extension portion 58 and the lower extension portion 51.

Next, the first outer conductor 32 is attached to the second outer conductor 33 from below. The bottom portion 37 and the base portion 36 of the first outer conductor 32 are disposed along the lower surface of the lower extension portion 51 of the second outer conductor 33. In this state, crimping tools (an anvil and a crimper) are applied to the barrel portion 35, and a crimping process is performed. The front barrel pieces 38, the intermediate barrel pieces 39, and the rear barrel pieces 41 are bent, and crimped and connected to the terminal portion of the electric wire 90. Specifically, the front barrel pieces 38 sandwich a rear end portion of the extension portion 49 therebetween, and are electrically connected to the shield portion 93 of the electric wire 90. The intermediate barrel pieces 39 are directly crimped and electrically connected to the shield portion 93 of the electric wire 90. The rear barrel pieces 41 are mechanically connected to the sheath 94 of the electric wire 90. Note that, in the first embodiment, crimping processes of the front barrel pieces 38, the intermediate barrel pieces 39, and the rear barrel pieces 41 may be performed at the same time or may be performed separately at time intervals.

In a state where the first outer conductor 32 and the second outer conductor 33 are attached to each other, the rising portions 45 of the first outer conductor 32 overlap the outer surface side of the extension portion 49, as shown in FIG. 2, and close the gaps G1 and G2 formed in the second outer conductor 33.

Moreover, as shown in FIGS. 2 and 5, the fastener portions 61 of the second outer conductor 33 oppose the fastening portions 47 of the rising main body portions 46 so as to come into contact with the fastening portions 47 in the front-rear direction. As shown in FIG. 2, the engaging portion 43 is disposed rearward of the main body portion 48 and opposes the main body portion 48 with a space therebetween.

Structure for Accommodating Shield Terminal in Housing

When the shield terminal 30 is accommodated in the housing 20, the main body portion 48 is inserted and fitted into the insertion portion 22 of the housing 20, and the plate-like portion 42 of the first outer conductor 32 is disposed along the lower surface of the accommodation groove 21 of the housing 20, as shown in FIG. 1. The engaging portion 43 protrudes downward from the plate-like portion 42 of the first outer conductor 32, and thus, as a result of the shield terminal 30 being lowered in an attachment process, the engaging portion 43 can enter the engagement portion 24 of the housing 20. Once the engaging portion 43 has entered the engagement portion 24, the rear surface of the engaging portion 43 (a surface on the rear side of the engaging portion 43) opposes the inner surface of the engagement portion 24 so as to come into contact with the inner surface of the engagement portion 24 in the up-down direction.

When a force F (see FIG. 1) of pulling out the shield terminal 30 rearward acts due to, for example, the electric wire 90 being pulled rearward in a state where the shield terminal 30 is accommodated in the housing 20, the rear surface of the engaging portion 43 comes into firm contact with the inner surface of the engagement portion 24, and takes on the force F. Accordingly, recession of the shield terminal 30 is restrained. In addition, recession of the main body portion 48 is also restrained, and thus it is possible to avoid a situation where the opposing surface 65 of the main body portion 48 is pressed against the inner surface of the insertion portion 22 of the housing 20 and is deformed. The reinforcement portion 44 is formed on the engaging portion 43, and thus, even if the rear surface of the engaging portion 43 comes into firm contact with the inner surface of the engagement portion 24, it is possible to avoid a situation where the engaging portion 43 is subjected to plastic deformation.

Incidentally, when the force F acts on the first outer conductor 32, there is a concern that the first outer conductor 32 will be inclined in a direction (upward direction UR, see FIGS. 1 and 2) of rotation about a portion where the engaging portion 43 and the engagement portion 24 are engaged with each other (a portion where the rear surface of the engaging portion 43 comes into contact with the inner surface of the engagement portion 24), and the first outer conductor 32 will be displaced relative to the second outer conductor 33 in the upward direction UR. However, in the first embodiment, the fastener portions 61 of the first outer conductor 32 come into contact with the fastening portions 47 of the second outer conductor 33 in the displacement direction, namely, the upward direction UR, and thus it is possible to prevent displacement of the first outer conductor 32 relative to the second outer conductor 33 in the upward direction UR. As a result, it is possible to maintain a state where the first outer conductor 32 and the second outer conductor 33 are properly attached to each other.

As described above, according to the first embodiment, the following effects can be exerted.

The engaging portion 43 is formed so as to protrude downward from the lower surface of the base portion 36 of the first outer conductor 32, and thus it is possible to avoid an increase in the size of the shield terminal 30 in the width direction. In addition, in the housing 20, the engagement portion 24 that receives the engaging portion 43 is formed in the lower surface of the accommodation groove 21, and falls within the width of the accommodation groove 21. Therefore, it is also possible to avoid an increase in the size of the connector 10 in the width direction.

Moreover, the engaging portion 43 is formed by cutting and raising a portion of the base portion 36 positioned between the barrel portion 35 and the main body portion 48, and thus it is easy to ensure positional accuracy and dimensional accuracy of the engaging portion 43, and, furthermore, it is also possible to increase the degree of freedom with which the engaging portion 43 can be formed.

Moreover, both the main body portion 48 and the engaging portion 43 are formed so as to extend in the up-down direction, and the opposing surface 65 of the main body portion 48 opposes the engaging portion 43, and thus the engaging portion 43 does not protrude independently below the shield terminal 30. Therefore, the size of the shield terminal 30 in the up-down direction does not increase due to the presence of the engaging portion 43. In addition, the rib-shaped reinforcement portion 44 is formed at the root portion of the engaging portion 43 on the front surface side of the engaging portion 43, and thus it is possible to avoid a situation where the engaging portion 43 is subjected to plastic deformation.

Furthermore, according to the first embodiment, the following effects can be exerted.

When, due to, for example, the electric wire 90 being pulled rearward, the first outer conductor 32 is about to become displaced relative to the second outer conductor 33 about the upward direction UR with respect to the portion where the engaging portion 43 and the engagement portion 24 are engaged with each other, the fastening portions 47 of the rising main body portions 46 of the first outer conductor 32 can come into contact with the fastener portions 61 of the second outer conductor 33, and thus it is possible to prevent displacement of the second outer conductor 33 relative to the first outer conductor 32.

Moreover, when the electric wire 90 is pulled rearward, the force F resulting from the pulling can be taken on by the portion of engagement between the engagement portion 24 and the engaging portion 43. Accordingly, recession of the main body portion 48 is restrained, and it is possible to avoid a situation where the main body portion 48 interferes with the inner surface of the insertion portion 22 of the housing 20, and is deformed.

Moreover, the fastening portions 47 are formed on the upper ends of the rising main body portions 46, and thus there is no need to perform a special process for forming the fastening portions 47 on the first outer conductor 32. In addition, as a result of the rising portions 45 closing a gap in the first outer conductor 32, it is possible to prevent leakage and intrusion of noise.

Other Embodiments of Present Disclosure

The first embodiment disclosed here is to be construed as illustrative and not limiting in all respects.

In the first embodiment, the engaging portion is formed at the base portion of the first outer conductor. However, in other embodiments, the engaging portion may also be formed in a portion of the first outer conductor other than the base portion, such as the barrel portion, as long as the engaging portion is shaped so as not to protrude outward in the width direction of the first outer conductor.

In the first embodiment, the engaging portion is formed by cutting and raising a portion of the base portion. However, in other embodiments, the engaging portion may be formed by folding a protruding portion of the base portion.

In the first embodiment, the main body portion is formed so as to extend in the up-down direction. However, in another embodiment, the main body portion may also be formed so as to extend in the front-rear direction continuous to the extension portion, the base portion, the bottom portion, and the like.

In the first embodiment, the outer conductor is constituted by the first outer conductor and the second outer conductor that are formed separately. However, in another embodiment, the outer conductor may also be a single member in which all of the constituent elements are integrated.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A shield terminal comprising:

a first outer conductor and a second outer conductor that are to be attached to each other, wherein the first outer conductor includes a barrel portion that is connected to a shield portion of an electric wire, and an engaging portion capable of engaging with a housing, the second outer conductor includes a main body portion and an extension portion that extends rearward from the main body portion, a rear end portion of the extension portion is held sandwiched between the barrel portion and the electric wire, a fastener portion is formed on a front side of the second outer conductor relative to the rear end portion of the extension portion, and a fastening portion formed on the first outer conductor capable of coming into contact with the fastener portion in a direction of rotation about the engaging portion is formed forward of the engaging portion of the first outer conductor.

2. The shield terminal according to claim 1, wherein the main body portion intersects the extension portion and extends in an up-down direction, and has a shape that enables insertion into the housing, and the engaging portion opposes the main body portion, rearward of the main body portion, in a state where the first outer conductor and the second outer conductor are attached to each other.

3. The shield terminal according to claim 1, wherein the first outer conductor includes a base portion that extends forward from the barrel portion, and a pair of rising portions that rise from right and left end portions of the base portion, the engaging portion has a shape obtained by folding a portion of the base portion, the fastening portion is formed at a leading end portion in a rising direction of each of the rising portions, and the rising portions are formed in a plate shape that overlaps an outer surface of the second outer conductor so as to close a gap in the second outer conductor.

4. A connector that includes the shield terminal according to claim 2 and the housing, wherein the housing includes an engagement portion to be engaged with the engaging portion, and an insertion portion into which the main body portion is inserted, forward of the engagement portion, and the insertion portion and the engagement portion are aligned with each other in a front-rear direction.

* * * * *